(12) United States Patent
Petersen

(10) Patent No.: US 11,637,491 B2
(45) Date of Patent: Apr. 25, 2023

(54) MULTI-STAGE POWER CONVERTER

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/110,765

(22) Filed: Dec. 3, 2020

(65) Prior Publication Data

US 2022/0181967 A1 Jun. 9, 2022

(51) Int. Cl.
*H02M 3/07* (2006.01)
*H02M 1/00* (2006.01)

(52) U.S. Cl.
CPC ....... *H02M 1/0095* (2021.05); *H02M 1/0067* (2021.05); *H02M 3/07* (2013.01)

(58) Field of Classification Search
CPC ... H02M 1/0067; H02M 1/007; H02M 1/0095
See application file for complete search history.

(56) References Cited

U.S. PATENT DOCUMENTS

| | | |
|---|---|---|
| 6,963,497 B1 | 11/2005 | Herbert |
| 7,230,405 B2 | 6/2007 | Jang et al. |
| 7,782,027 B2 | 8/2010 | Williams |
| 8,427,113 B2 | 4/2013 | Xing et al. |
| 9,559,589 B2 | 1/2017 | Petersen |
| 9,768,682 B2 | 9/2017 | Banag |
| 9,948,177 B2 | 4/2018 | Alarcon-Cot |

(Continued)

FOREIGN PATENT DOCUMENTS

| | | |
|---|---|---|
| DE | 102015209330 A1 | 11/2016 |
| DE | 10 2015 212 331 A1 | 1/2017 |

(Continued)

OTHER PUBLICATIONS

"Multi-Level Conversion: High Voltage Choppers and Voltage-Source Inverters," by T.A. Meynard et al., PESC '92 Record. 23rd Annual IEEE Power Electronics Specialists Conference, Jun. 29-Jul. 3, 1992, pp. 397-403.

(Continued)

*Primary Examiner* — Alex Torres-Rivera
(74) *Attorney, Agent, or Firm* — Saile Ackerman LLC; Stephen B. Ackerman

(57) ABSTRACT

A power converter includes a first conversion circuit coupled to a first port, a second conversion circuit coupled to a second port, and a driver. The first conversion circuit has a first flying-capacitor coupled to a first network of switches, and two inductors both coupled to the second conversion circuit. The second conversion circuit has a second flying-capacitor coupled to a second network of switches. The driver drives the first and the second network of switches with a sequence of states having at least one of a first phase and a second phase. When the power converter operates as a step-down converter, the first phase charges the second flying-capacitor and the second phase discharges the second flying-capacitor. When the power converter operates as a step-up converter, the first phase discharges the second flying-capacitor and the second phase charges the second flying-capacitor.

20 Claims, 9 Drawing Sheets

(56) References Cited

U.S. PATENT DOCUMENTS

| | | | |
|---|---|---|---|
| 10,003,261 B2 | 6/2018 | Petersen et al. | |
| 10,075,080 B1 | 9/2018 | Scoones | |
| 10,218,255 B1 | 2/2019 | Petersen | |
| 10,230,302 B2 | 3/2019 | Petersen | |
| 10,256,729 B1 | 4/2019 | Notsch | |
| 10,291,117 B2 | 5/2019 | Petersen | |
| 10,389,237 B1 | 8/2019 | Chee et al. | |
| 10,530,256 B1 | 1/2020 | Jayaraman | |
| 10,547,241 B1 | 1/2020 | Li | |
| 10,615,697 B1 | 4/2020 | Ferrari | |
| 10,622,890 B1 | 4/2020 | Lidsky et al. | |
| 10,637,352 B2 | 4/2020 | Illiano | |
| 10,727,747 B2 | 7/2020 | Macri | |
| 10,756,623 B1 | 8/2020 | Petersen | |
| 10,790,742 B1 | 9/2020 | Petersen | |
| 10,804,798 B1 | 10/2020 | Rizzolatti | |
| 10,811,974 B1 | 10/2020 | Petersen | |
| 10,826,395 B2 | 11/2020 | Song | |
| 10,879,801 B2 | 12/2020 | Zhang et al. | |
| 11,005,371 B2 | 5/2021 | Cannillo | |
| 11,011,988 B1 | 5/2021 | Jefremow | |
| 11,011,991 B1 | 5/2021 | Mercer | |
| 11,228,243 B2 | 1/2022 | Petersen | |
| 2001/0022735 A1 | 9/2001 | Zanuccoli | |
| 2008/0079393 A1 | 4/2008 | Spartano et al. | |
| 2008/0157732 A1 | 7/2008 | Williams | |
| 2008/0158915 A1 | 7/2008 | Williams | |
| 2008/0239772 A1 | 10/2008 | Oraw et al. | |
| 2009/0033289 A1 | 2/2009 | Xing et al. | |
| 2009/0174466 A1 | 7/2009 | Hsieh et al. | |
| 2010/0188065 A1 | 7/2010 | Shiwaya | |
| 2011/0062940 A1 | 3/2011 | Shvartsman | |
| 2013/0147543 A1 | 6/2013 | Dai et al. | |
| 2014/0070787 A1 | 3/2014 | Amo | |
| 2014/0268888 A1 | 9/2014 | Lv | |
| 2015/0015088 A1 | 1/2015 | Petersen | |
| 2015/0061613 A1 | 3/2015 | Kondou | |
| 2015/0084611 A1 | 3/2015 | Agrawal et al. | |
| 2015/0280553 A1* | 10/2015 | Giuliano | H02M 3/07 |
| | | | 323/282 |
| 2015/0311793 A1 | 10/2015 | Khayat et al. | |
| 2016/0344214 A1 | 11/2016 | Petersen et al. | |
| 2016/0352218 A1 | 12/2016 | Stauth | |
| 2017/0126146 A1 | 5/2017 | Petersen | |
| 2017/0149337 A1 | 5/2017 | Petersen | |
| 2017/0163157 A1 | 6/2017 | Petersen | |
| 2017/0244318 A1 | 8/2017 | Giuliano | |
| 2017/0279348 A1 | 9/2017 | Kulkarni | |
| 2017/0302093 A1* | 10/2017 | Petersen | H02M 3/158 |
| 2018/0026518 A1 | 1/2018 | Liu | |
| 2018/0175726 A1 | 6/2018 | Petersen | |
| 2019/0149041 A1 | 5/2019 | Larsen | |
| 2019/0207519 A1 | 7/2019 | Chakraborty | |
| 2019/0280618 A1 | 9/2019 | Yan et al. | |
| 2019/0341850 A1 | 11/2019 | Macri | |
| 2019/0348913 A1 | 11/2019 | Zhang | |
| 2020/0044578 A1 | 2/2020 | Mangudi | |
| 2020/0091818 A1* | 3/2020 | Toni | H02M 3/07 |
| 2020/0144909 A1 | 5/2020 | Baek | |
| 2020/0212795 A1* | 7/2020 | Das | H02M 3/158 |
| 2020/0295655 A1 | 9/2020 | Takahiro | |
| 2020/0350817 A1 | 11/2020 | De | |
| 2021/0050786 A1 | 2/2021 | Park | |
| 2021/0099088 A1 | 4/2021 | Cannillo | |
| 2021/0152082 A1 | 5/2021 | Ozanoglu | |
| 2021/0152100 A1 | 5/2021 | Zillo | |
| 2021/0203179 A1 | 7/2021 | Gambetta | |
| 2021/0234462 A1 | 7/2021 | Cannillo et al. | |
| 2021/0288576 A1* | 9/2021 | Rizzolatti | H02M 3/07 |
| 2022/0038006 A1 | 2/2022 | Ellis | |

FOREIGN PATENT DOCUMENTS

| | | |
|---|---|---|
| DE | 102015212331 A1 | 1/2017 |
| DE | 10 2016 217 040 A1 | 3/2018 |
| DE | 10 2019 002 880 A1 | 10/2019 |
| DE | 102019002880 A1 | 10/2019 |
| EP | 3582383 A2 | 12/2019 |
| WO | 2014/154390 A1 | 10/2014 |

OTHER PUBLICATIONS

"A Fully-Integrated Switched-Capacitor 2:1 Voltage Converter with Regulation Capability and 90% Efficiency at 2.3A/mm$^2$," by Leland Chang et al., 2010 Symposium on VLSI Circuits/Technical Digest of Technical Papers, Jul. 2010, pp. 55-56.

"A Flying Capacitor Multilevel Converter with Sampled Valley-Current Detection for Multi-Mode Operation and Capacitor Voltage Balancing," by Jan S. Rentmeister et al., 2016 IEEE Energy Conversion Congress and Exposition (ECCE), Sep. 18-22, 2016, 8 pages.

"Hybrid Buck Converter Optimization and Comparison for Smart Phone Integrated Battery Chargers," by Gabriel Gabian et al., 2018 IEEE Applied Power Electronics Conference and Exposition (APEC), Mar. 4-8, 2018, pp. 2148-2154.

"72 V Hybrid DC-to-DC Converter Reduces Intermediate Bus Converter Size by up to 50%," by Bruce Haug, Analog Dialogue 52-02, Feb. 2018, found: analogdialogue.com, pp. 1-3.

German Office Action, File No. 10 2020 200 927.9, Applicant: Dialog Semiconductor (UK) Limited, dated Jul. 7, 2020, 6 pages.

Co-Pending U.S. Pat. No. D. 20-001G, "A Power Converter," U.S. Appl. No. 16/900,669, filed Jun. 12, 2020, by Holger Petersen, 72 pages.

Co-Pending U.S. Pat. No. D. 20-001_2G, "A Power Converter," U.S. Appl. No. 16/900,678, filed Jun. 12, 2020, by Holger Petersen, 70 pages.

U.S. Notice of Allowance, U.S. Appl. No. 16/900,669, Applicant: Holger Petersen, dated Sep. 27, 2021, 29 pages.

Co-Pending U.S. Pat. No. D. 19-085S, U.S. Appl. No. 16/919,928, filed Jul. 2, 2020, Inventor: Cannilo et al., "Hybrid multi-level power converter with inter-state inductor," 33 pages.

Co-Pending U.S. Pat. No. D. 19-012G, U.S. Appl. No. 16/386,735, filed Apr. 17, 2019, Inventor: Holger Petersen, "A Power Converter," 37 pages.

U.S. Notice of Allowance, U.S. Appl. No. 16/386,735, First Named Inventor: Holger Petersen, dated Jun. 10, 2020, 13 pages.

U.S. Office Action, U.S. Appl. No. 16/386,735, Applicant: Holger Petersen, dated Feb. 10, 2020, 21 pages.

"Split-Phase Control: Achieving Complete Soft-Charging Operation of a Dickson Switched-Capacitor Converter," by Yutian Lei et al., IEEE Transactions on Power Electronics, vol. 31, No. 01, Jan. 2016, pp. 770-782.

"A Hybrid Dual-Path Step-Down Converter with 96.2% Peak Efficiency using a 250mΩ Large-DCR Inductor," by Yeunhee Huh et al., 2018 Symposium on VLSI Circuits Digest of Technical Papers, Jun. 18-22, 2018, pp. 225-226.

"A Hybrid Structure Dual-Path Step-Down Converter With 96.2% Peak Efficiency Using 250-mΩ Large-DCE Inductor," by Yuenhee Huh et al., IEEE Journal of Solid-State Circuits, vol. 54, No. 4, Apr. 2019, pp. 959-967.

"Multiphase buck converters with extended duty cycle," by Yungtaek Jang et al., Twenty-First Annual IEEE Applied Power Electronics Conference and Exposition, APEC '06, Mar. 19-23, 2006, pp. 38-44.

"A Hybrid Inductor-Based Flying-Capacitor-Assisted Step-Up/Step-Down DC-DC Converter with 96.56% Efficiency," by Yong-Min Ju et al., 2017 IEEE International Solid-State Circuits Conference (ISSCC), Feb. 5-9, 2017, pp. 184-186.

"A Fully-Integrated 3-Level DC-DC Converter for Nanosecond-Scale DVFX," by Wonyoung Kim et al., IEEE Journal of Solid-State Circuits, vol. 47, No. 1, Jan. 2012, pp. 206-219.

(56) References Cited

OTHER PUBLICATIONS

"A Hybrid Switched-Capacitor/Inductor Converter for Small Conversion Ratios," by Norah Elena Nakibuuka, Thesis: M. Eng., Massachusetts Institute of Technology, Department of Electrical Engineering and Computer Science, 2013, May 2013, 69 pages.

"Analysis of Double Step-Down Two-Phase Buck Converter for VRM," by K. Nishijima et al, INTELEC 05—Twenty-Seventh International Telecommunications Conference, Sep. 18-22, 2005, pp. 497-502.

"Right-Half-Plane Zero Elimination of Boost Converter Using Magnetic Coupling With Forward Energy Transfer," by Behzad Poorali et al., IEEE Transactions on Industrial Electronics, vol. 66, No. 11, Nov. 2019, pp. 8454-8462.

"Fully Integrated Buck Converter with 78% Efficiency at 365mW Output Power Enabled by Switched-Inductor—Capacitor Topology and Inductor Current Reduction Technique," by Nghia Tang et al., 2019 IEEE International Solid- State Circuits Conference—(ISSCC), Feb. 17-21, 2019, pp. 153-154.

"A New Approach to Low Ripple-Noise Switching Converters On the Basis of Switched-Capacitor Converters," by Tohru Umeno et al., 1991., IEEE International Sympoisum on Circuits and Systems, Jun. 11-14, 1991, pp. 1077-1080.

"Zero Inductor Voltage Multilevel Bus Converter," by Samuel Webb et al., 2018 IEEE Applied Power Electronics Conference and Exposition (APEC), Mar. 4-8, 2018, pp. 2175-2182.

"Three-Level Buck Converter for Envelope Tracking Applications," by Vahid Yousefzadeh et al., IEEE Transactions on Power Electronics, vol. 21, No. 2, Mar. 2006, pp. 549-552.

U.S. Office Action, U.S. Appl. No. 16/919,928, Applicant: Cannillo et al., dated Jan. 27, 2022, 22 pages.

German Office Action, File No. 10 2020 200 927.9, Applicant: Dialog Semiconductor (UK) Limited, dated Feb. 24, 2022, 5 pages.

U.S. Notice of Allowance, U.S. Appl. No. 17/123,417, Applicant: Holger Petersen, dated Mar. 16, 2022, 36 pages.

U.S. Office Action, U.S. Appl. No. 16/900,678, Applicant: Holger Petersen, dated Aug. 13, 2021, 24 pages.

German Office Action, File No. 10 2020 213 004.3, Applicant: Dialog Semiconductor (UK) Limited, dated Jun. 24, 2021, 6 pages.

German Office Action, File No. 10 2020 213 005.1, Applicant: Dialog Semiconductor (UK) Limited, dated Jun. 24, 2021, 6 pages.

U.S. Notice of Allowance, U.S. Appl. No. 16/900,678, Applicant: Holger Petersen, dated Jun. 3, 2022, 20 pages.

U.S. Notice of Allowance, U.S. Appl. No. 16/919,928, Applicant: Cannillo et al., dated Jun. 13, 2022, 12 pages.

\* cited by examiner

MULTI-STAGE POWER CONVERTER

RELATED PATENT APPLICATION

This application is related to U.S. patent application Ser. No. 16/900,669, filed on Jun. 12, 2020, U.S. patent application Ser. No. 16/900,678, filed on Jun. 12, 2020, and U.S. patent application Ser. No. 16/919,928, filed on Jul. 2, 2020, all of which are owned by a common assignee, and all of which are herein incorporated by reference in their entirety.

TECHNICAL FIELD

The present disclosure relates to a multi-stage power converter and a method of operating the same. In particular, the present disclosure relates to a two-stage power converter suitable for use with high currents.

BACKGROUND

Traditional buck converters operate by applying a voltage drop across an inductor defined as the voltage difference between the input and the output voltage ($V_{IN}-V_{OUT}$). In order to improve power efficiency and/or reduce the inductor coil size, multi-level hybrid power converters have been proposed. Such hybrid power converters use flying capacitors combined with inductors to limit the voltage applied across the inductor. For instance, publication titled "A new approach to low ripple-noise switching converters on the basis of switched-capacitor converters", IEEE, 1991 by Umeno, et al describes a topology optimized for a conversion ratio $V_{OUT}/V_{IN}$ close to 1. When operating as a step-down converter the circuit reduces the voltage across the inductor towards $V_{IN}-2V_{OUT}$. Patent documents U.S. Pat. Nos. 7,230,405 and 8,427,113 describe topologies allowing to reduce the voltage drop across the inductor to $V_{IN}/2-V_{OUT}$. U.S. Pat. No. 9,559,589 describes at FIG. 1C a boost topology using multiple flying capacitors allowing a further reduction of the voltage applied across the inductor towards $V_{OUT}/4-V_{IN}$.

Various topologies have also been reported in which a minimum average inductor current is achieved when placing the inductor in front of a current multiplying switching capacitor unit, see for instance U.S. Pat. No. 6,963,497 (FIG. 1), U.S. Pat. No. 7,782,027 (FIG. 18), and reverse operation of FIGS. 1F, 1G in U.S. Pat. No. 9,559,589 (reverse operation of FIGS. 1F and 1G).

Despite these advances, there remains a need for a power converter providing efficient power conversion at small output-to-input voltage conversion ratio for instance for $V_{OUT}/V_{IN} \ll 1/5$.

SUMMARY

According to a first aspect of the disclosure, there is provided a power converter for providing an output voltage with an output-to-input conversion ratio, the power converter having a ground port, a first port, and a second port, wherein when the power converter operates as a step-down converter, the first port receives an input voltage and the second port provides the output voltage, and when the power converter operates as a step-up converter, the second port receives an input voltage and the first port provides the output voltage; the power converter comprising a first conversion circuit coupled to the first port; a second conversion circuit coupled to the second port; and a driver; wherein the first conversion circuit comprises a first flying capacitor (C1) coupled to a first network of switches, and a first inductor and a second inductor both coupled to the second conversion circuit; wherein the second conversion circuit comprises a second flying capacitor (C2) coupled to a second network of switches; the driver being adapted to drive the first and the second network of switches with a sequence of states during a drive period, the sequence of states comprising at least one of a first phase, and a second phase, wherein when the power converter operates as a step-down converter, the first phase is configured to charge the second flying capacitor (C2) and the second phase is configured to discharge the second flying capacitor, and when the power converter operates as a step-up converter, the first phase is configured to discharge the second flying capacitor and the second phase is configured to charge the second flying capacitor.

Optionally, the first network of switches comprises a first switch (S1) to couple the first flying capacitor to the first port; a first ground switch (S4) to couple the first flying capacitor to ground; a first inductor switch (S2) to couple the first flying capacitor to the second inductor; a second ground switch (S3) to couple the second inductor to ground.

Optionally, the second network of switches comprises a second switch (S5) to couple the first inductor and the second inductor to the second port; a third switch (S6) to couple the second flying capacitor (C2) to the second port; a third ground switch (S7) to couple the second flying capacitor (C2) to ground.

Optionally, the first phase comprises at least one of a first state (DV/D1), a second state (DP1/D1) and a third state (DP2/D1), wherein when the power converter operates as a step-down converter the first state is a de-magnetization state (DV/D1) to demagnetize the first and the second inductors, the second state is a primary magnetization state (DP1/D1) to magnetize the first inductor and de-magnetize the second inductor, and the third state is a secondary magnetization state (DP2/D1) to magnetize the second inductor and de-magnetize the first inductor; and when the power converter operates as a step-up converter the first state is a magnetization state to magnetize the first and the second inductors, the second state is a primary de-magnetization state to de-magnetize the first inductor and magnetize the second inductor, and the third state is a secondary de-magnetization state to de-magnetize the second inductor and magnetize the first inductor.

Optionally, the second phase comprises at least one of a fourth state (DV/D2), a fifth state (DP1/D2), and a sixth state (DP2/D2); wherein when the power converter operates as a step-down converter the fourth state is a de-magnetization state (DV/D2) to demagnetize the first and the second inductors, the fifth state is a primary magnetization state to magnetize the first inductor and de-magnetize the second inductor, and the sixth state is a secondary magnetization state to magnetize the second inductor and de-magnetize the first inductor; and when the power converter operates as a step-up converter the fourth state is a magnetization state to magnetize the first and the second inductors, the fifth state is a primary de-magnetization state to de-magnetize the first inductor and magnetize the second inductor, and the sixth state is a secondary de-magnetization state to de-magnetize the second inductor and magnetize the first inductor.

Optionally, wherein in the first state (DV/D1) the first port is de-coupled from the second port and the ground port is coupled to the second port via a first path and a second path, the first path comprising the first ground switch (S4), the first inductor, the second flying capacitor (C2) and the third switch (S6); the second path comprising the second ground switch (S3), the second inductor, the second flying capacitor (C2) and the third switch (S6).

Optionally, wherein in the second state (DP1/D1), the input port is coupled to the second port via a path comprising the first switch (S1), the first flying capacitor, the first inductor, the second flying capacitor (C2) and the third switch (S6); and wherein the ground port is coupled to the second port via a ground path comprises the third ground switch (S3), the second inductor, the second flying capacitor (C2) and the third switch (S6).

Optionally, wherein in the third state (DP2/D1), the first port is de-coupled from the second port, and the ground port is coupled to the second port via a first ground path and a second ground path, the first ground path comprising the first ground switch (S4), the first flying capacitor (C1), the first inductor switch (S2), the second inductor, the second flying capacitor (C2) and the third switch (S6); and wherein the second ground path comprises the first ground switch (S4), the first inductor, the second flying capacitor (C2) and the third switch (S6).

Optionally, wherein in the fourth state (DV/D2) the first port is de-coupled from the second port and the ground port is coupled to the second port via a first path, a second path, and a third path; the first path comprising the first ground switch (S4), the first inductor, and the second switch (S5), wherein the second path comprises the second ground switch (S3), the second inductor, and the second switch (S5); wherein the third path comprises the third ground switch (S7), the second flying capacitor (C2) and the second switch (S5).

Optionally, wherein in the fifth state (DP1/D2), the first port is coupled to the second port via a path comprising the first switch (S1), the first flying capacitor, the first inductor and the second switch (S5); and wherein the ground port is coupled to the second port via a first ground path, and a second ground path wherein the first ground path comprises the third ground switch (S3), the second inductor, and the second switch (S5); and wherein the second ground path comprises the third ground switch (S7), the second flying capacitor (C2), and the second switch (S5).

Optionally, wherein in the sixth state (DP2/D2), the first port is de-coupled from the second port and the ground port is coupled to the second port via a first ground path, a second ground path, and a third ground path; the first ground path comprising the first ground switch (S4), the first flying capacitor (C1), the first inductor switch (S2), the second inductor and the second switch (S5); wherein the second ground path comprises the first ground switch (S4), the first inductor, and the second switch (S5); and wherein the third ground path comprises the third ground switch (S7), the second flying capacitor (C2) and the second switch (S5).

Optionally, wherein the first conversion circuit comprises a third flying capacitor (C1'); and wherein the first network of switches comprises a fourth switch (S8) to couple the third flying capacitor (C1') to the first port, and a second inductor switch (S9) to couple the third flying capacitor (C1') to the first inductor.

Optionally, wherein in the second state (DP1/D1), the first port is coupled to the second port via a path comprising the first switch (S1), the first flying capacitor, the first inductor, the second flying capacitor (C2) and the third switch; and wherein the ground port is coupled to the second port via a first ground path and a second ground path, the first ground path comprising the third ground switch (S3), the third flying capacitor (C1'), the second inductor switch (S9), the first inductor, the second flying capacitor (C2) and the third switch (S6); and wherein the second ground path comprises the third ground switch (S3), the second inductor, the second flying capacitor (C2) and the third switch (S6).

Optionally, wherein in the third state (DP2/D1), the first port is coupled to the second port via a path comprising the fourth switch (S8), the third flying capacitor (C1'), the second inductor, the second flying capacitor (C2) and the third switch (S6); and wherein the ground port is coupled to the second port via a first ground path and a second ground path, the first ground path comprising the first ground switch (S4), the first flying capacitor (C1), the first inductor switch (S2), the second inductor, the second flying capacitor (C2) and the third switch (S6); and wherein the second ground path comprises the first ground switch (S4), the first inductor, the second flying capacitor (C2) and the third switch (S6).

Optionally, wherein in the fifth state (DP1/D2), the first port is coupled to the second port via a path comprising the first switch (S1), the first flying capacitor, the first inductor and the second switch (S5); and wherein the ground port is coupled to the second port via a first ground path, a second ground path and a third ground path; the first ground path comprising the third ground switch (S3), the third flying capacitor (C1'), the second inductor switch (S9), the first inductor and the second switch (S5); wherein the second ground path comprises the third ground switch (S3), the second inductor, and the second switch (S5); and wherein the third ground path comprises the third ground switch (S7), the second flying capacitor (C2), and the second switch (S5).

Optionally, wherein in the sixth state (DP2/D2), the first port is coupled to the second port via a path comprising the fourth switch (S8), the third flying capacitor (C1'), the second inductor, and the second switch (S5); and wherein the ground port is coupled to the second port via a first ground path, a second ground path, and a third ground path; the first ground path comprising the first ground switch (S4), the first flying capacitor (C1), the first inductor switch (S2), the second inductor and the second switch (S5); wherein the second ground path comprises the first ground switch (S4), the first inductor, and the second switch (S5); and wherein the third ground path comprises the third ground switch (S7), the second flying capacitor (C2) and the second switch (S5).

Optionally, the second conversion circuit further comprises a fourth flying capacitor (C4), and wherein the second network of switches further comprises a fifth switch (S10) to couple the fourth flying capacitor to the second port; and a fourth ground switch (S11) to couple the fourth flying capacitor to ground.

Optionally, the driver is adapted to maintain the second state and the third state for a same predetermined duration, and/or wherein the driver is adapted to maintain the fifth state and the sixth state for a same predetermined duration.

Optionally, the driver is adapted to operate the first network of switches at a first frequency, and the second network of switches at a second frequency. For instance, the second switching frequency may be greater than the first switching frequency. For example, the second switching frequency may be up to two orders of magnitude greater than the first frequency.

According to a second aspect of the disclosure, there is provided a method of converting power with an output-to-input conversion ratio, the method comprising i) providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first conversion circuit coupled to the first port, a second conversion circuit coupled to the second port; wherein the first conversion circuit comprises a first flying capacitor (C1) coupled to a first network of switches, and a first inductor and a second inductor both coupled to the second conversion circuit; wherein the second conversion circuit comprises a second flying capacitor (C2) coupled to a second network of switches; and ii) driving the first and the second network of switches with a sequence of states during a drive period, the sequence of states comprising at least one of a first phase and a second phase, wherein when the power converter operates as a step-down converter, the second flying capacitor (C2) charges in the first phase and discharges in the second phase, and when the power converter operates as a step-up converter, the second flying capacitor (C2) discharges in the first phase and charges in the second phase.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which.

DETAILED DESCRIPTION

Figure 1:
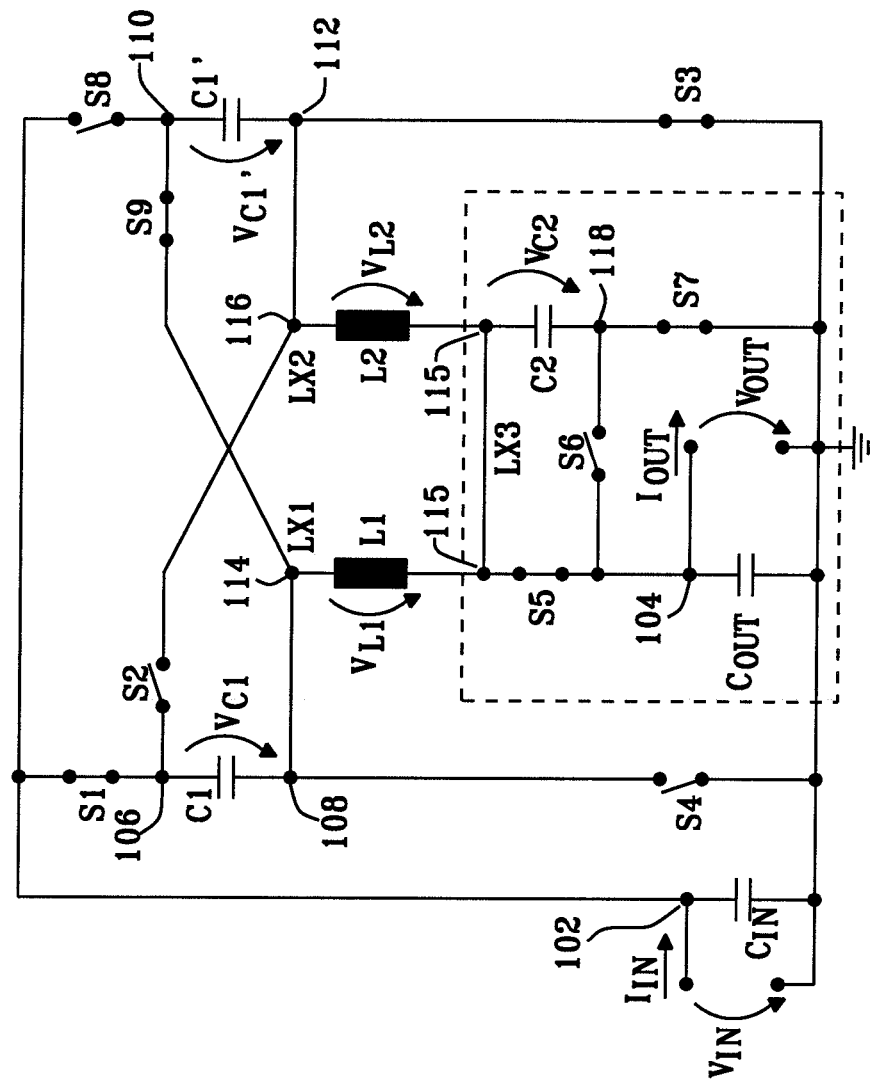
FIG. 1 is a diagram of a power converter according to the disclosure.
Figure 1:
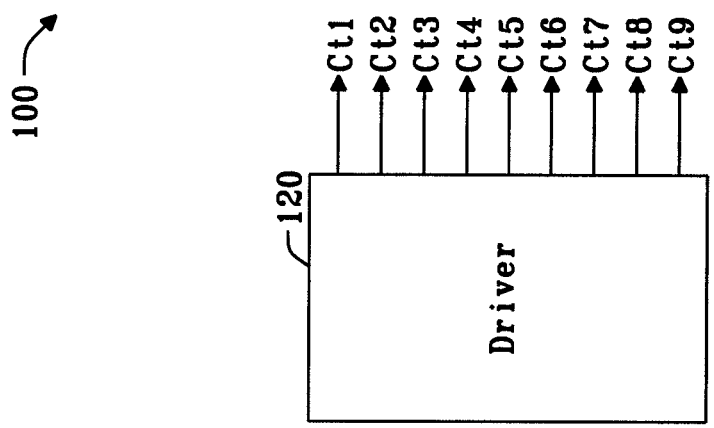

FIG. 1 is a diagram of a DC-DC converter 100 according to the disclosure. The DC-DC converter 100 includes a first conversion circuit, also referred to as first converter stage, coupled to a second conversion circuit also referred to as second converter stage. A driver 120 is provided to operate the first and second converter stages.

The first conversion circuit is coupled to a first port 102. The first conversion circuit includes a pair of capacitors C1 and C1', a pair of inductors L1 and L2, and a first network of switches formed by six switches labelled S1, S2, S3, S4, S8 and S9.

The second conversion circuit, also referred to as switch capacitor converter, is coupled to a second port 104. The second conversion circuit includes a third flying capacitor C2 and a reservoir capacitor Cout coupled to a second network of switches formed by three switches labelled S5, S6 and S7.

The power converter may be operated as a step-down converter or as a step-up converter. When operating as a step-down converter the first port receives an input voltage and the second port provides the output voltage. Conversely, when the power converter operates as a step-up converter the second port receives an input voltage and the first port provides the output voltage. In FIG. 1, the converter 100 is described as a step-down converter, in this case the first port may be referred to as the input port or input node 102, while the second port may be referred to as the output port or output node 104.

An input capacitor Cin is provided between the input node 102 and ground and an output capacitor Cout is provided between the output node 104 and ground. The capacitors Cin and Cout are connected to a fixed ground voltage and may be referred to as reservoir capacitors. The capacitors C1, Cr and C2 have terminals provided with varying voltages and may be referred to as flying capacitors.

The first flying capacitor C1 has a first terminal, at node 106, coupled to the input node 102 via a first input switch S1; and a second terminal, at node 108, coupled to ground via a first ground switch S4. Similarly, the second flying capacitor Cr has a first terminal, at node 110, coupled to the input node 102 via a second input switch S8; and a second terminal, at node 112, coupled to ground via a second ground switch S3.

The first inductor L1 has an input terminal at switching node 114 (LX1) and an output terminal at switching node 115 (LX3). The first inductor input terminal is coupled to C1 at node 108 and to Cr at node 110 via an inductor switch S9. The first inductor output terminal is coupled to the second conversion circuit at switching node 115 (LX3).

Similarly, the second inductor L2 has an input terminal at node 116 and an output terminal at node 115. The second inductor input terminal is coupled to C1' at node 112 and to C1 at node 106 via another inductor switch S2. The second inductor output terminal is coupled to the second conversion circuit at switching node 115 (LX3).

The third flying capacitor C2 has a first terminal, at node 115 (LX3) and a second terminal, at node 118, coupled to ground via a third ground switch S7. The first inductor L1 and second inductor L2 are coupled to the output node via a first output switch S5. The third flying capacitor C2 is coupled to the output node via a second output switch S6 provided between nodes 118 and 104.

The driver 120 is adapted to generate nine control signals Ct1-Ct9 to operate the switches S1-S9 respectively. The driver 120 is configured to open or close various switches to operate the converter in a desired switching state. The driver 120 is also configured to drive the first and second network of switches with a sequence of states during a drive period T. The sequence of states comprises at least one of a first phase and a second phase. In the first phase the flying capacitor C2 charges and in the second phase the flying capacitor C2 is coupled in parallel to the output capacitor Cout, and discharges. The first network of switches may be operated at a first frequency, and the second network of switches at a second frequency. For instance, the second frequency may be greater than the first frequency. The driver 120 may also be configured to change a duration of the switching state forming the sequence of states in order to achieve a target conversion ratio. The driver is adapted to maintain the one or more states of the first phase, and the one or more states of the second phase for a predetermined duration during the drive period.

The first phase may include at least one of a first state (DV/D1), a second state (DP1/D1) and a third state (DP2/D1). The first state, also referred to as first phase de-magnetization state (DV/D1) is configured to demagnetize both the first inductor and the second inductor. The second state, also referred to as first phase primary magnetization state (DP1/D1) is configured to magnetize the first inductor and de-magnetize the second inductor. The third state, also referred to as first phase secondary magnetization state (DP2/D1) is configured to magnetize the second inductor and de-magnetize the first inductor.

Figure 2A:
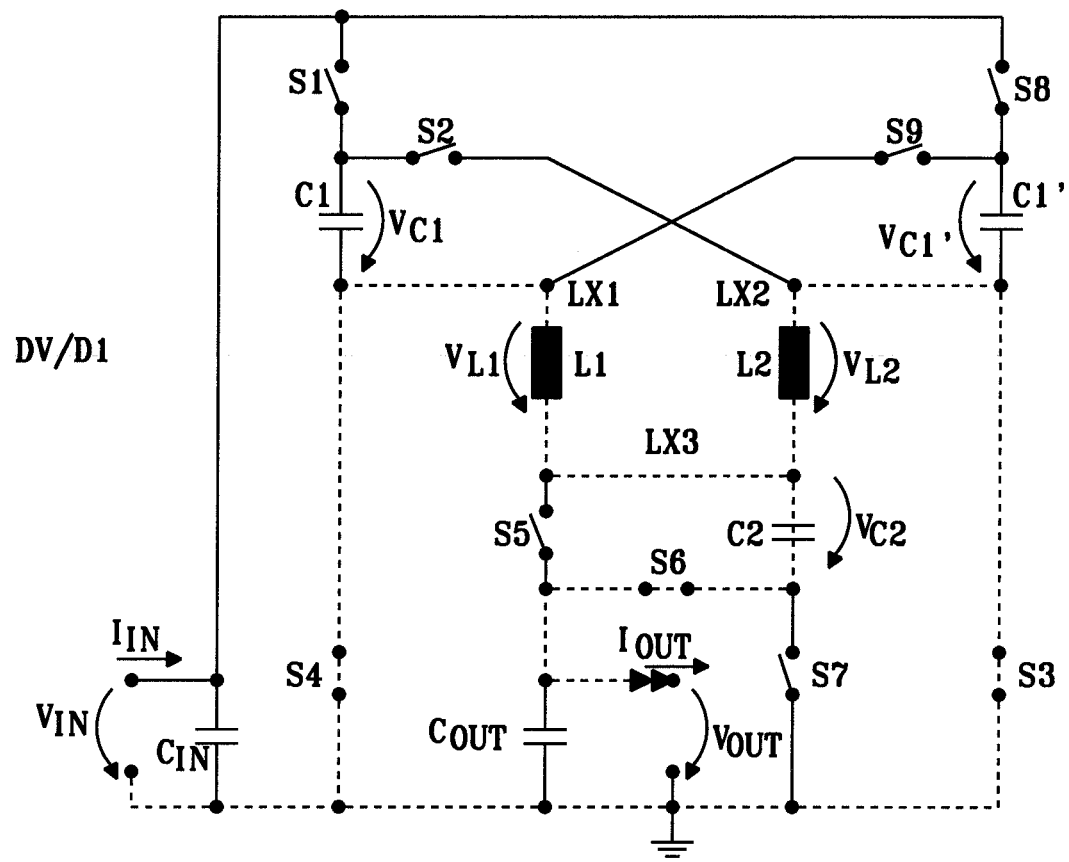
FIG. 2A is a diagram of the power converter of FIG. 1 operating in a first phase de-magnetization state.

FIG. 2A illustrates the converter 100 in the first phase de-magnetization state (DV/D1) to demagnetize both L1 and L2. In the first phase de-magnetization state (DV/D1), the switches S3, S4 and S6 are turned on (closed) and the switches S1, S2, S5, S7, S8 and S9 are turned off (open). The input terminal is de-coupled from the output terminal and the ground terminal is coupled to the output terminal via a first path and a second path, the first path includes the first ground switch S4, the first inductor L1, the third flying capacitor C2, and the second output switch S6. The second path includes the second ground switch S3, the second inductor L2, the third flying capacitor C2 and the second output switch S6.

Figure 2B:
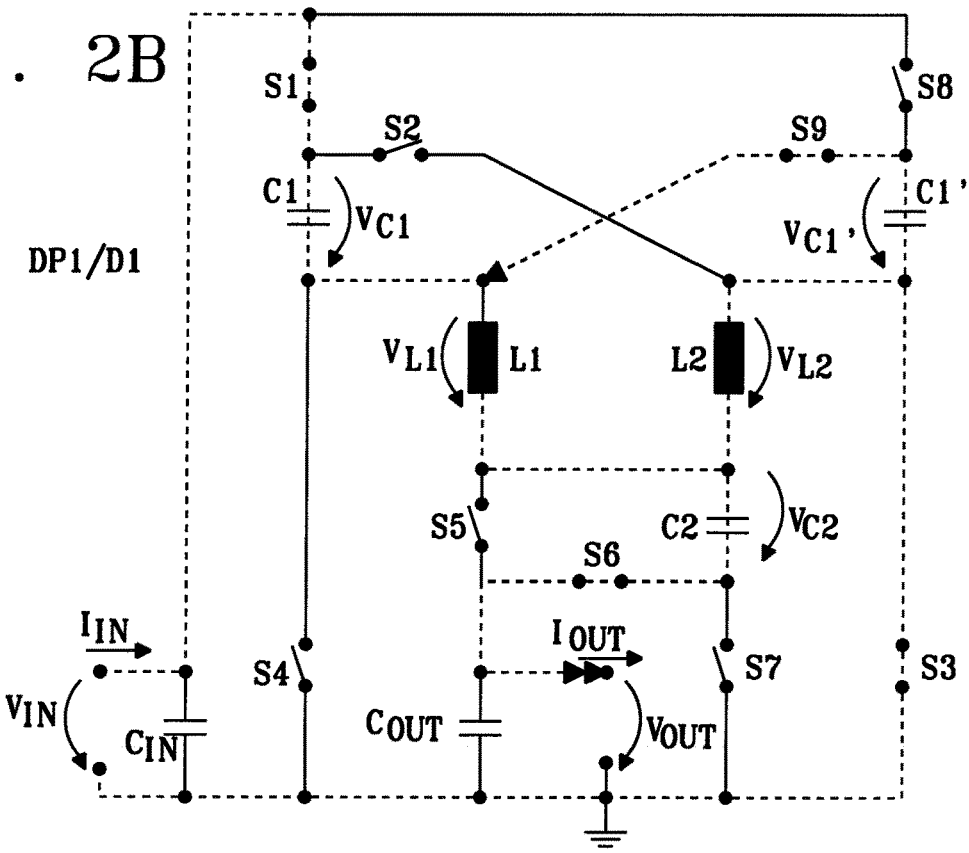
FIG. 2B is a diagram of the power converter of FIG. 1 operating in a first phase primary magnetization state.

FIG. 2B illustrates the converter 100 in the first phase primary magnetization state (DP1/D1). In the first phase primary magnetization state the switches S1, S3, S6 and S9 are turned on (closed) and the switches S2, S4, S5, S7 and S8 are turned off (open). The input terminal is coupled to the output terminal via an input path comprising the first input switch S1, the first flying capacitor C1, the first inductor L1, the third flying capacitor C2 and the second output switch S6. The ground terminal is coupled to the output terminal via a first ground path and a second ground path. The first ground path includes S3, C1', S9, L1, C2 and S6. The second ground path includes S3, L2, C2 and S6.

Figure 2C:
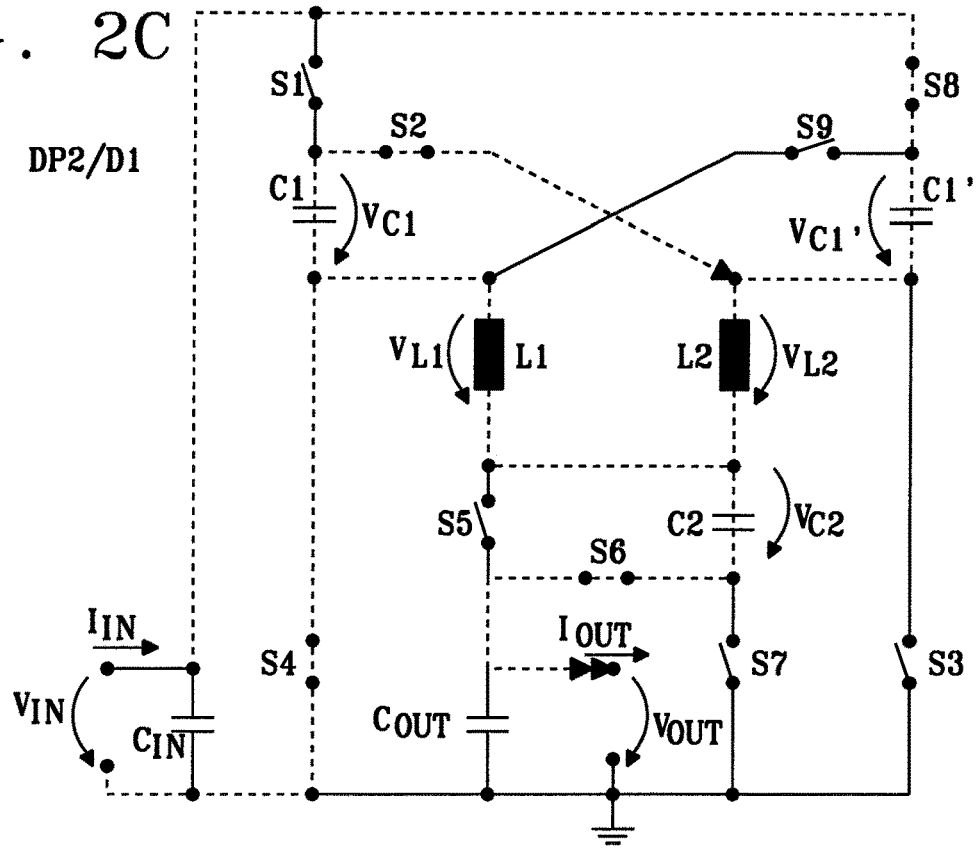
FIG. 2C is a diagram of the power converter of FIG. 1 operating in a first phase secondary magnetization state.

FIG. 2C illustrates the converter 100 in the first phase secondary magnetization state (DP2/D1). In the first phase secondary magnetization state the switches S2, S4, S6 and S8 are turned on (closed) and the switches S1, S3, S5, S7 and S9 are turned off (open). The input terminal is coupled to the output terminal via an input path that includes the second input switch S8, the second flying capacitor C1', the second inductor L2, the third flying capacitor C2 and the second output switch S6. The ground terminal is coupled to the output terminal via a first ground path and a second ground path. The first ground path includes the first ground switch S4, the first flying capacitor C1, the first inductor switch S2, the second inductor L2, the third flying capacitor C2 and the second output switch S6. The second ground path includes the first ground switch S4, the first inductor L1, the third flying capacitor C2 and the second output switch S6.

During each one of the states DV, DP1 and DP2 of the first phase D1, the flying capacitor C2 is being charged. As a result, one or more states must be included in the driving sequence to discharge C2.

The second phase may include at least one of a fourth state (DV/D2), a fifth state (DP1/D2), and a sixth state (DP2/D2). The fourth state, also referred to as second phase de-magnetization state (DV/D2) is configured to demagnetize both the first inductor and the second inductor. The fifth state, also referred to as second phase primary magnetization state (DP1/D2) is configured to magnetize the first inductor and de-magnetize the second inductor. The sixth state, also referred to as second phase secondary magnetization state (DP2/D2) is configured to magnetize the second inductor and de-magnetize the first inductor.

Figure 3A:
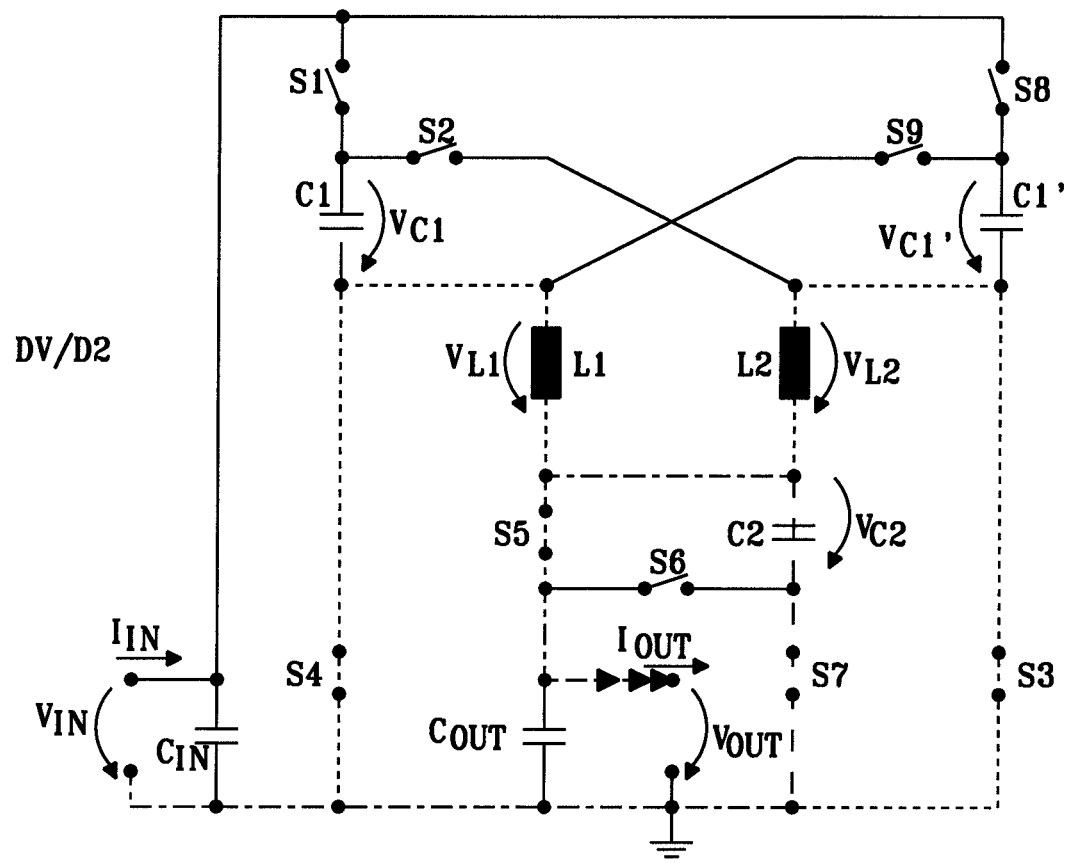
FIG. 3A is a diagram of the power converter of FIG. 1 operating in a second phase de-magnetization state.

FIG. 3A illustrates the converter 100 in the second phase de-magnetization state (DV/D2). In the second phase de-magnetization state the switches S3, S4, S5 and S7 are turned on (closed) and the switches S1, S2, S6, S8 and S9 are turned off (open). The input terminal is de-coupled from the output terminal and the ground terminal is coupled to the output terminal via a first path, a second path, and a third path. The first path includes the first ground switch S4, the first inductor L1, and the first output switch S5. The second path includes the second ground switch S3, the second inductor L2, and the first output switch S5. The third path includes S7, C2 and S5.

Figure 3B:
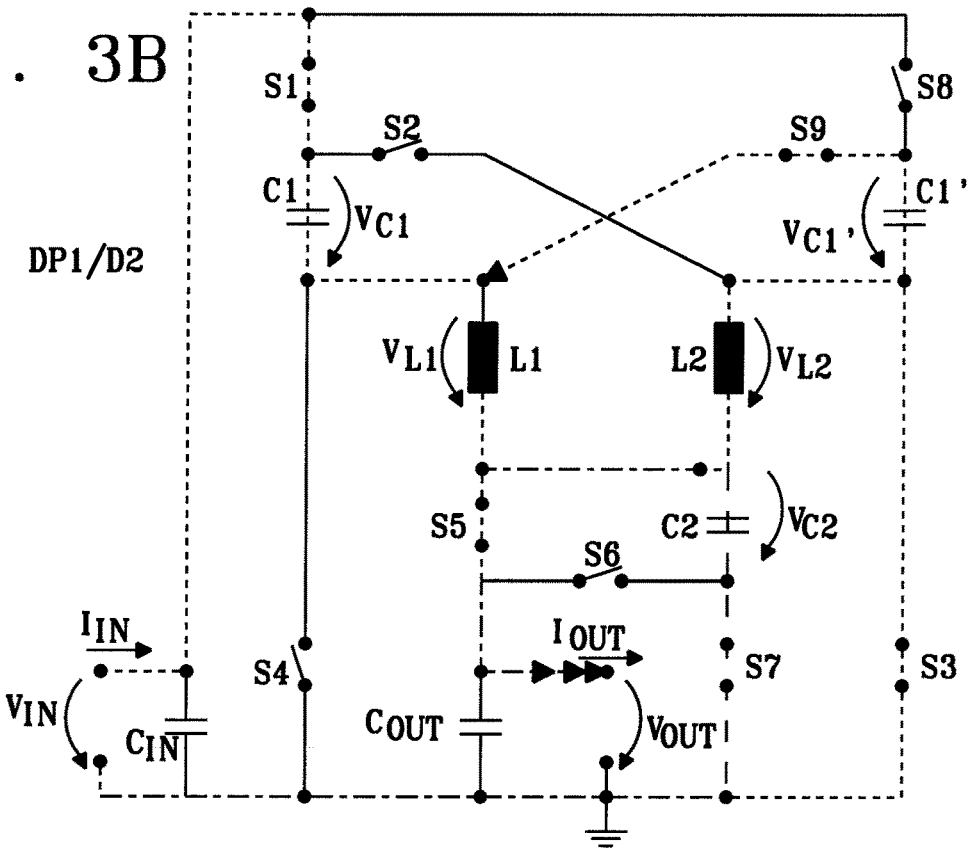
FIG. 3B is a diagram of the power converter of FIG. 1 operating in a second phase primary magnetization state.

FIG. 3B illustrates the converter 100 in the second phase primary magnetization state (DP1/D2). In the second phase primary magnetization state, the switches S1, S3, S5, S7 and S9 are turned on (closed) and the switches S2, S4, S6 and S8 are turned off (open). The input terminal is coupled to the output terminal via an input path comprising the first input switch S1, the first flying capacitor C1, the first inductor L1 and the first output switch S5. The ground terminal is coupled to the output terminal via a first ground path, a second ground path and a third ground path. The first ground path includes the third ground switch S3, the second flying capacitor C1', the second inductor switch S9, the first inductor L1 and the first output switch S5. The second ground path includes the third ground switch S3, the second inductor L2, and the first output switch S5. The third ground path includes S7, C2, and S5.

Figure 3C:
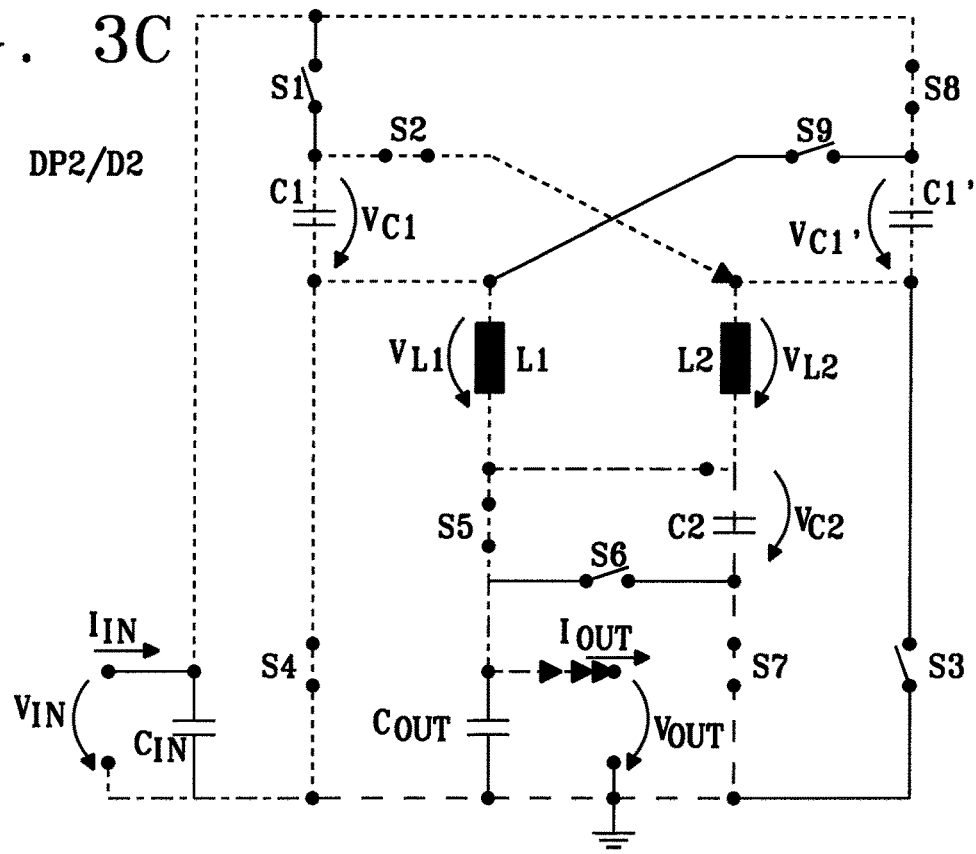
FIG. 3C is a diagram of the power converter of FIG. 1 operating in a second phase secondary magnetization state.

FIG. 3C illustrates the converter 100 in the second phase secondary magnetization state (DP2/D2). In the second phase secondary magnetization state, the switches S2, S4, S5, S7 and S8 are turned on (closed) and the switches S1, S3, S6 and S9 are turned off (open). The input terminal is coupled to the output terminal via an input path that includes the second input switch S8, the second flying capacitor C1', the second inductor L2, and the first output switch S5. The ground terminal is coupled to the output terminal via a first ground path, a second ground path, and a third ground path. The first ground path includes the first ground switch S4, the first flying capacitor C1, the first inductor switch S2, second inductor L2 and the first output switch S5. The second ground path includes the first ground switch S4, the first inductor L1, and the first output switch S5. The third ground path includes the third ground switch S7, the flying capacitor C2 and the first output switch S5. In the states of the second phase D2 the flying capacitor C2 is coupled in parallel to the output capacitor Cout, hence discharging C2.

In operation, the driving sequence has a period T that includes a first phase D1 having a period T1 and a second phase D2 having a period T2, such that T=T1+T2.

It will be appreciated that various driving sequence can be implemented depending on the application. For fulfilling the volt-sec balance principle across the inductors as well as the charge balance principle across the flying capacitors, the various possible sequences have to fulfil the system of equations (2), presented later in the description. For D=0 this results in a sequence S1 containing the states (DV/D1)/(DV/D2). For D=1 this results in a sequence S2 containing the states (DP1/D1)/(DP2/D1)/(DP1/D2)/(DP2/D2). For 0<D<1 this results in a sequence S3 containing the states (DV/D1)/(DP1/D1)/(DP2/D1)/(DV/D2)/(DP1/D2)/(DP2/D2). The order of states may be arbitrary changed within each sequence as long as the relative duration follows the system of equations (2). The description is therefore not limited to a particular choice of sequence.

The first conversion circuit controls the charge balance of the first and second flying capacitors C1 and Cr. During the primary and secondary magnetizations states DP1 and DP2 the capacitors C1 and C1' experience current flows in opposite directions. During the primary magnetization state DP1, C1 charges while C1' discharges. Similarly, during the secondary magnetization state DP2, C1 discharges while C1' charges.

Theoretically charge balance is achieved when the duty cycle of DP1 ($D_{DP1}$) is equal to the duty cycle of DP2 ($D_{DP2}$), (See system of equations (2)). For instance, in the first phase D1 the on-time Δ1 of state DP1 is equal to the on-time Δ2 of state DP2. Similarly, in the second phase D2 the on-time Δ3 of state DP1 is equal to the on-time of state DP2.

However, in practice small asymmetries may exist between various components, for instance between L1 and L2. As a result, there may be a need to equalize the voltage across C1 and C1' by introducing small variations in the relative duration of states DP1 and DP2. The charge balance of flying capacitors C1 and C1' results in a balanced average current through the inductors L1 and L2.

The ratio of the output current $I_{OUT}$ over the current through the inductors L1 and L2 may be expressed as:

$$\frac{I_{OUT}}{I_{L1} + I_{L2}} = 2 - D_{D2}, \quad (1)$$

$$D_{D1} = 1 - D_{D2}$$

$$D_{D2} \in [0, 1]$$

In which $D_{D1}$ is the total duty cycle of the states of the first phase D1 (FIGS. 2A, 2B and 2C), and $D_{D2}$ is the total duty cycle of the states of the second phase D2 (FIGS. 3A, 3B and 3C).

For $D_{D2}=0$ the output current $I_{OUT}$ is equal to twice the inductor current through L1 and L2 ($I_{L1}+I_{L2}$). However, this would require an infinite current through the flying capacitor C2. For a more balanced current distribution during the operation phases D1 and D2, the switching interval may be split evenly so that $D_{D1}=D_{D2}=\frac{1}{2}$. In this case the output current $I_{OUT}$ is equal to 1.5 the total current from the inductors, that is $$\frac{3}{2}(I_{L1} + I_{L2}).$$

Since the inductors L1 and L2 are coupled to the output terminal via the second conversion circuit, the total average current through both inductors is less compared with topologies in which the inductor(s) are directly connected to the output. As a result, the average inductor current is also reduced. The amount by which the inductor current is reduced is defined by the conversion ratio of the second conversion circuit. Therefore, for a given inductor, the DC resistance (DCR) losses are reduced by the square of the conversion ratio of the second conversion circuit. Since L1 and L2 have a reduced current rating, the physical dimensions of inductors L1 and L2 can also be reduced.

The charge balance of the flying capacitor C2 is provided by operating the converter using the first phase D1 and the second phase D2. During operation in the first phase D1, C2 charges and during operation in the second phase D2, C2 discharges. In the states DV/D2, DP1/D2 and DP2/D2, the flying capacitor C2 is connected in parallel to $C_{OUT}$. As a result, the charge balance can be achieved independently from the duty cycle of the first and second phase, as long as $D_{D2}$ is greater than zero.

The relationship between converter output and input voltage is obtained by applying the volt-sec balance principle to the voltage across the inductors in combination with the duty cycle of the second stage.

$$\begin{cases} \frac{V_{OUT}}{V_{IN}} = \frac{D}{3}, \\ \frac{D_{DP1}}{D_{D1}} = \frac{D_{DP2}}{D_{D1}} = \frac{D_{DP1}}{D_{D2}} = \frac{D_{DP2}}{D_{D2}} = \frac{D}{2}, \quad D \in [0, 1] \\ D_{DV} = 1 - D, \\ D_{D1} = D_{D2} = \frac{1}{2}, \end{cases} \quad (2)$$

In which D is the relative duty cycle with respect to the duration of the first phase D1 and second phase D2, $D_{D1}$ is the total duty cycle of the states of the first phase D1, $D_{D2}$ is the total duty cycle of the states of the second phase D2, $D_{DP1}$ is the duty cycle of the primary magnetization state (either in the first phase or in the second phase), $D_{DP2}$ is the duty cycle of the secondary magnetization state (either in the first phase or in the second phase), and $D_{DV}$ is the duty cycle of the de-magnetization state (either in the first phase or in the second phase).

The relation $D_{D1}=D_{D2}=\frac{1}{2}$ corresponds to a specific example operation of the converter which will achieve the highest conversion efficiency. However, the operation of the converter is not restricted to this specific condition.

The maximum output-to-input conversion ratio derived from equation (2) is $V_{OUT}/V_{IN}=\frac{1}{3}$ for D=1.

The conversion ratio of the power converter may be defined as the product of the conversion ratio of the first stage with the conversion ratio of the second stage. The conversion ratio CR1 of the first converter stage may be defined as the average voltage at the switching nodes LX1 and LX2 over the input voltage $$Vin:CR1 = \frac{\langle VLX1 \rangle + \langle VLX2 \rangle}{2V_{IN}}.$$

The conversion ratio CR2 of the second converter stage may be defined as the output voltage over the average voltage at the switching nodes LX3:

$$CR2 = \frac{V_{OUT}}{\langle VLX3 \rangle}.$$

Figure 4:
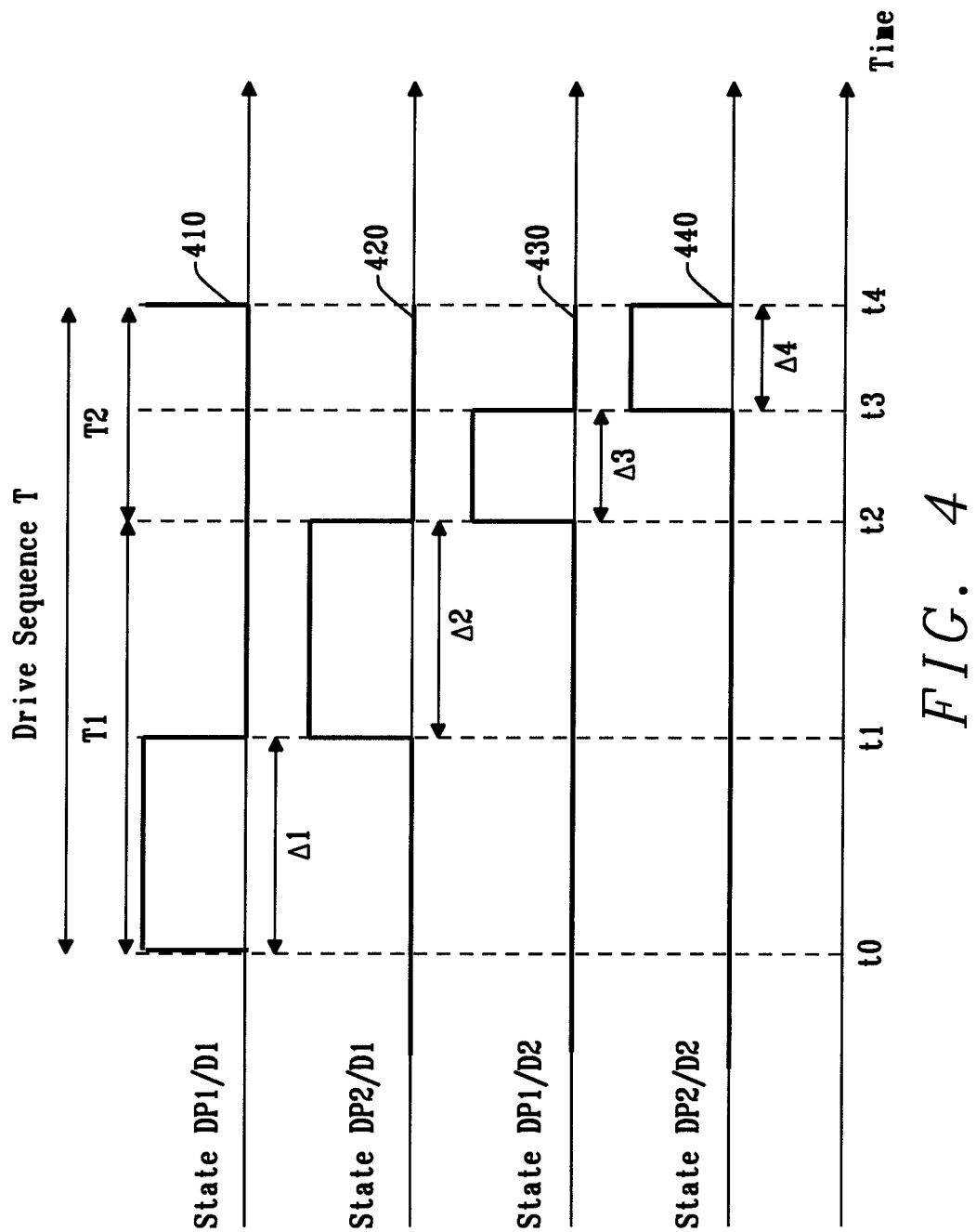
FIG. 4 is an exemplary drive sequence for operating the power converter of FIG. 1.

FIG. 4 illustrates a drive sequence for operating the DC-DC converter 100 over a drive period T, also referred to as switching cycle. In this example, the driver 120 drives the DC-DC converter with state DP1/D1 (waveform 410), between the times t0 and t1 for a duration Δ1, with the state DP2/D1 (waveform 420) between the times t1 and t2 for a duration Δ2, with state DP1/D2 (waveform 430) between the times t2 and t3 for a duration Δ3, with the state DP2/D2 (waveform 440) between the times t3 and t4 for a duration Δ4. This sequence is then repeated over time to deliver the required output power. It will be appreciated that a dead-time may be introduced at times t1, t2, t3, and t4.

In this example, the duty cycle T1 of the first phase is twice the duty cycle T2 of the second phase. It will be appreciated that various duty cycles may be used. For instance, the duty cycle T1 of the first phase may be chosen to be equal to the duty cycle T2 of the second phase. This may be used to optimize high current efficiency.

The switches of the converter 100 may be implemented using various types of power switches such as Field-effect transistors (FETs). The voltage ratings for the switches S1 and S8 of the converter 100 may vary depending on the start-up circuitry being implemented. In principle the input switches S1 and S8 have a voltage rating of $V_{IN}$ as they need to sustain the input voltage $V_{IN}$ upon start up, however S1 and S8 may be implemented with a voltage rating of $V_{IN}/2$ when a start-up circuitry is put in place to provide a balanced drop of $V_{IN}$ across the switches S1 and S4, and as well across the switches S8 and S3. Alternatively a simpler start-up scheme may be implemented to close the switches S4 and S3 and then drop $V_{IN}$ across the switches S1 and S8 as long as the voltage across the flying capacitors is zero.

The inductor switches S2, S9 and the ground switches S3, S4 have a voltage rating of $V_{IN}/2$. The ground switch S7 and the output switches S5 and S6 have a voltage rating of $V_{OUT}$. The voltage rating of the switches is therefore reduced compared to the voltage rating of a conventional buck converter requiring $V_{IN}$-rated switches. Furthermore, the voltage rating of the switches in the second converter stage is as low as the relatively small output voltage $V_{OUT}$. This is advantageous as power switches with a low voltage rating have typically a better figure of merit characterized by relatively small specific resistance and gate capacitance.

The two converter stages may be integrated into a single converter unit, or alternatively may be implemented inside separate units. For example, the switches of the first conversion circuit, the flying capacitors C1 and C1' and the inductors L1 and L2 could become part of a pre-converter stage generating a PWM signal with an average level close to a required bus voltage. Its operation may be limited to compensate the variations of the converter input voltage (line regulation). The switches of the second conversion circuit and the flying capacitor C2, can serve as a second stage that adapts its duty cycle to finetune the overall converter output voltage, for instance for compensating a drop caused by variable load current, hence providing load regulation.

The inductive connection provided by L1 and L2 between the first conversion stage and the second conversion stage enables independent switching frequencies of the switches of the first switching network and second switching network, respectively. As the switches in the second converter stage only require a voltage rating in the range of the output voltage, the second stage may switch at much higher frequency with similar switching loss than the first converter stage. For instance, the second stage may operate at a frequency that is 10 or 100 times faster than the frequency of the first stage. For low output voltage this operation enables a reduction of the relative output voltage ripple.

Figure 5:
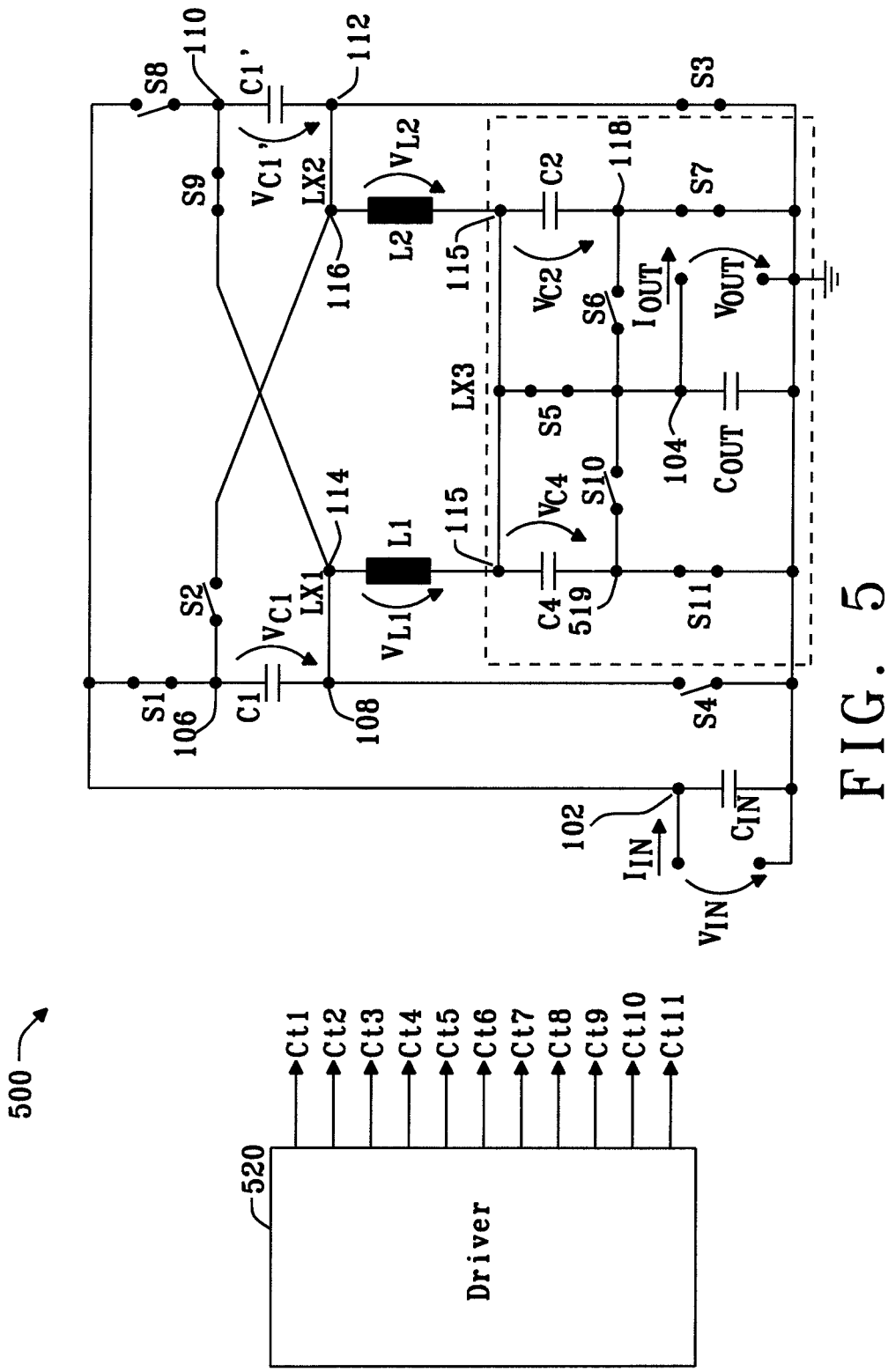
FIG. 5 is a diagram of another power converter according to the disclosure.

FIG. 5 shows another power converter. The converter 500 shares many similar components to those illustrated in the circuit 100 of FIG. 1. The same reference numerals have been used to represent corresponding components and their description will not be repeated for sake of brevity. In this example the second conversion circuit includes an additional flying capacitor C4, an additional ground switch S11 and an additional output switch S10.

The flying capacitor C2 has a first terminal at the switching node LX3 115 and a second terminal, at node 118, coupled to ground via the third ground switch S7. The fourth flying capacitor C4 has a first terminal at node LX3 115, and a second terminal, at node 519, coupled to ground via the fourth ground switch S11. The flying capacitor C2 is coupled to the output node via the second output switch S6 provided between nodes 118 and 104. The fourth flying capacitor C4 is coupled to the output node via the third output switch S10 provided between nodes 519 and 104. The first and second inductors L1, L2 are coupled to the output node 104 via the first output switch S5.

The driver 520 is adapted to generate eleven control signals Ct1-Ct11 to operate the switches S1-S11 respectively. The driver 520 is configured to drive the first and second network of switches with a sequence of states during a drive period T comprising a first phase D1 and a second phase D2 as described above in relation to FIG. 1.

The first phase may include at least one of a first phase de-magnetization state (DV/D1) to demagnetize the first and the second inductor, a first phase primary magnetization state (DP1/D1) to magnetize the first inductor and de-magnetize the second inductor, and a first phase secondary magnetization state (DP2/D1) to magnetize the second inductor and de-magnetize the first inductor. The second phase may include at least one of a second phase de-magnetization state (DV/D2) to demagnetize the first and the second inductor, a second phase primary magnetization state (DP1/D2) to magnetize the first inductor and de-magnetize the second inductor, and a second phase secondary magnetization state (DP2/D2) to magnetize the second inductor and de-magnetize the first inductor.

In the switching state or states of the first phase D1 the switches S6 and S10 are turned on (closed) and the switches S5, S7 and S11 are turned off (open). In the switching state or states of the second phase D2 the switches S6 and S10 are turned off (open) and the switches S5, S7 and S11 are turned on (closed). The switches S1, S2, S3, S4, S8 and S9 of the first network of switches may be operated at a first switching frequency. The switches S5, S6, S7, S10 and S11 of the second network of switches may be operated at a second switching frequency. In operation the fourth flying capacitor C4 and the switches S10 and S11 are used to distribute the total output current across two parallel switching capacitor phases.

Figure 6:
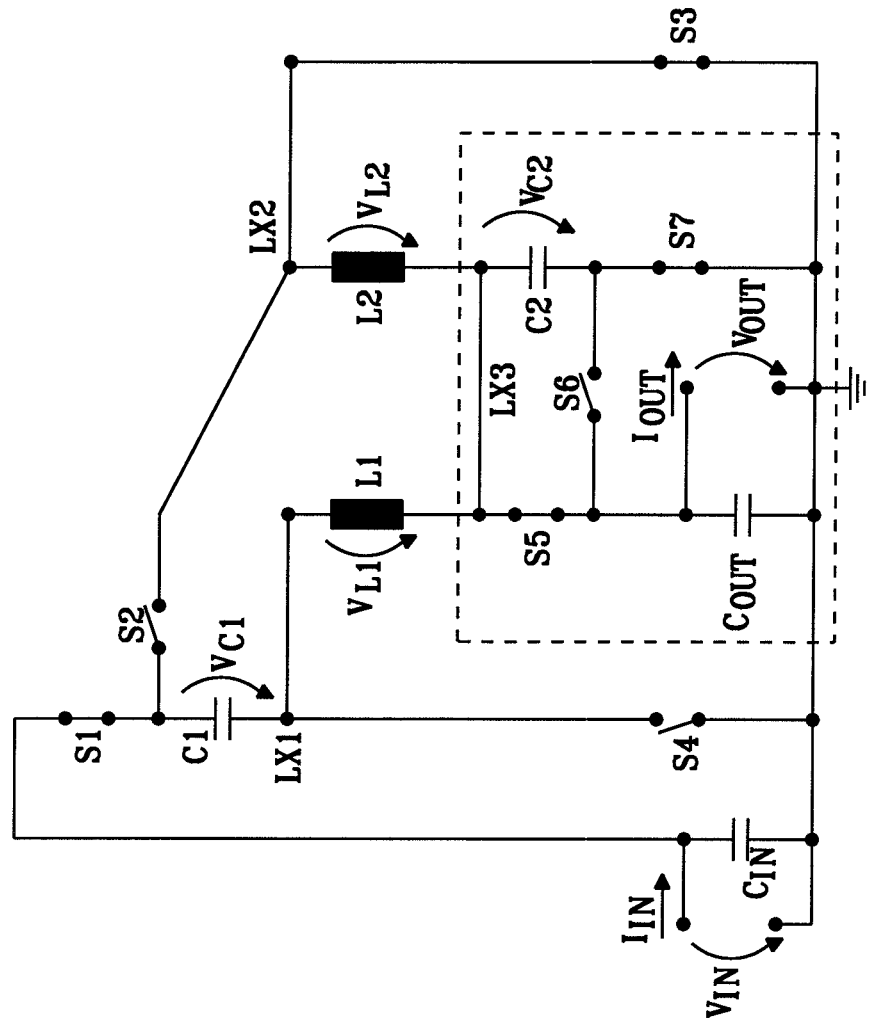
FIG. 6 is a diagram of yet another power converter according to the disclosure.
Figure 6:
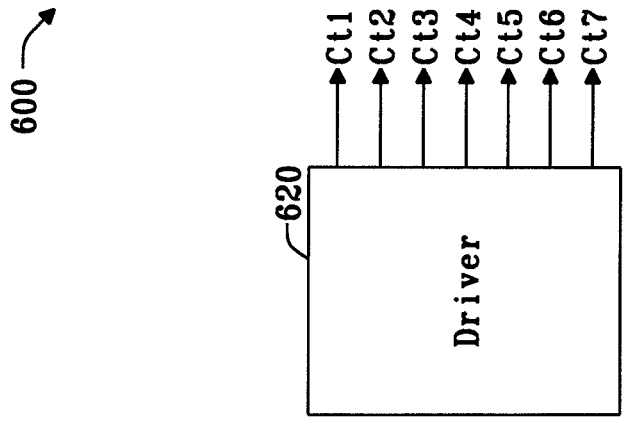

FIG. 6 illustrates another power converter having a simpler topology compared with the topologies 100 and 500. The converter 600 shares many similar components to those illustrated in the circuit 100 of FIG. 1. The same reference numerals have been used to represent corresponding components and their description will not be repeated for sake of brevity. In this example the second conversion circuit remain the same as in FIG. 1, however the first conversion circuit has been simplified by removing the switches S8, S9 and the second flying capacitor C1'. The driver 620 is adapted to generate seven control signals Ct1-Ct7 to operate the switches S1-S7 respectively.

The operation of the power converter 600 is similar to the operation of the converter 100 of FIG. 1. However, in this case during the magnetization state DP1 the inductor L1 is magnetized by a single magnetization path via the flying capacitor C1. Similarly, during the magnetization state DP2 the inductor L2 is magnetized by a single magnetization path via the flying capacitor C1.

The power converter 600 is more compact than the power converter 100, however in operation the current distribution through the power switches is less balanced, especially through the ground switches S3 and S4, and different numbers of serial power switches are used during the magnetization of inductors L1 and L2. Compared with the power converter 100, the input peak current ripple is twice as large, and the maximum output-to-input conversion ratio $V_{OUT}/V_{IN}$ is 50% lower.

The DC-DC converters described in relation to FIGS. 1 to 6 have been described as step-down converters. It will be appreciated that such converters may be operated in reverse (that is using the input as the output and the output as the input) as Boost converters to achieve step-up conversion. In this scenario the magnetizing (de-magnetizing) phase in the buck operation becomes a de-magnetizing (magnetizing) phase in the boost operation. In addition when the power converter operates as a step-up converter, the second flying capacitor (C2) discharges in the first phase and charges in the second phase.

The flying capacitances of the first and second conversion circuits may be implemented via single or multiple capacitors connected in series and/or in parallel. The capacitances may also be composed from a capacitor network that is re-configurable during converter operation.

In various exemplary implementations, the second stage of the power converters of FIGS. 1 to 6 may be combined with the Point of Load (POL), for instance by implementing the second stage as part of a microprocessor.

This is made possible by the fact that the second stage is purely capacitive and that capacitors can store up to thousand times the energy of an inductor with the same volume. In addition, the switches of the second stage only need to handle voltages in the range of the input voltage of the load.

Figure 7:
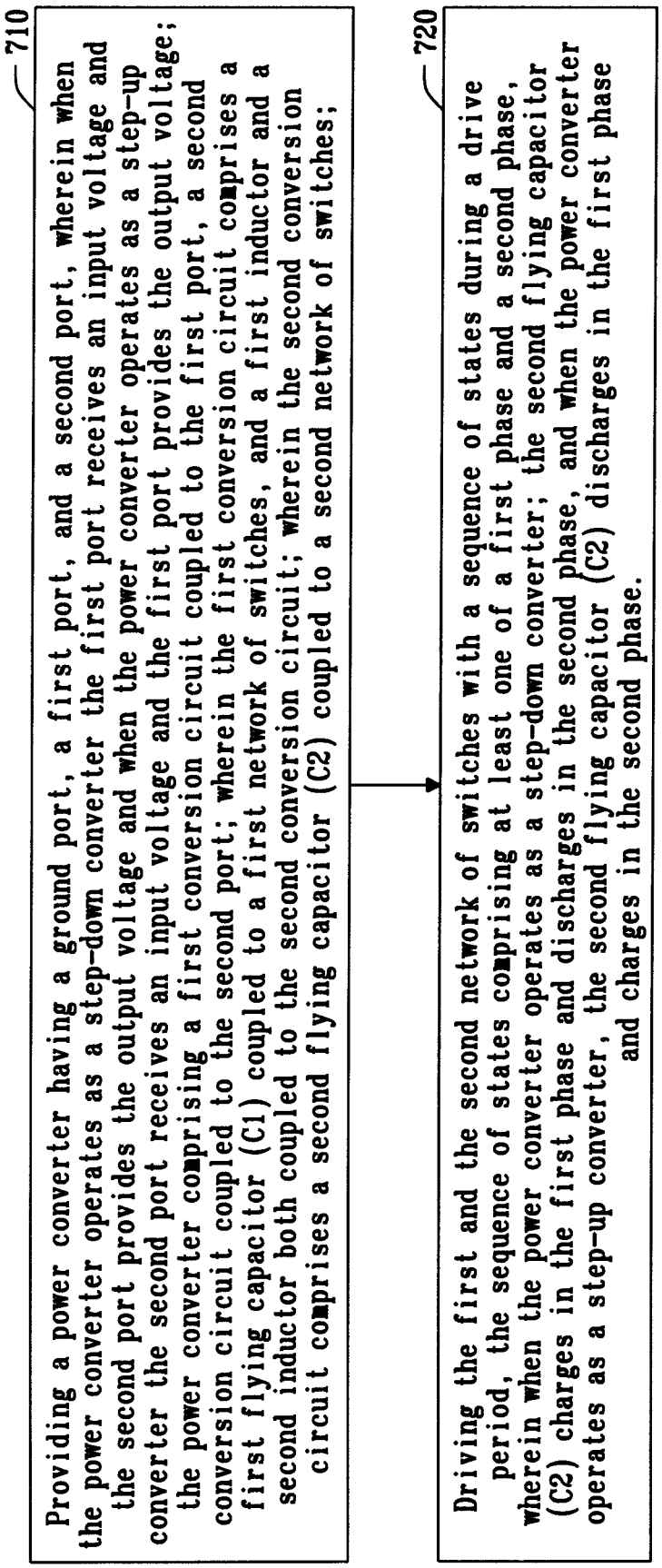
FIG. 7 is a flow chart of a method for converting power according to the disclosure.

FIG. 7 is a flow chart of a method for converting power with an output-to-input conversion ratio.

At step 710 a power converter is provided. The power converter has a ground port, a first port, and a second port. When the power converter operates as a step-down converter the first port receives an input voltage and the second port provides the output voltage and when the power converter operates as a step-up converter the second port receives an input voltage and the first port provides the output voltage. The power converter further includes a first conversion circuit coupled to the first port, a second conversion circuit coupled to the second port. The first conversion circuit comprises a first flying capacitor (C1) coupled to a first network of switches, and two inductor (first inductor and a second inductor) both coupled to the second conversion circuit. The second conversion circuit comprises a second flying capacitor (C2) coupled to a second network of switches.

At step 720 the first and the second network of switches are driven with a sequence of states during a drive period. The sequence of states comprises at least one of a first phase and a second phase, wherein when the power converter operates as a step-down converter, the second flying capacitor (C2) charges in the first phase and discharges in the second phase, and when the power converter operates as a step-up converter, the second flying capacitor (C2) discharges in the first phase and charges in the second phase.

A skilled person will appreciate that variations of the disclosed arrangements are possible without departing from the disclosure. Accordingly, the above description of the specific embodiments is made by way of example only and not for the purpose of limitation. It will be clear to the skilled person that minor modifications may be made without significant changes to the operation described.

What is claimed is:

1. A power converter for providing an output voltage with an output-to-input conversion ratio, the power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first conversion circuit coupled to the first port;
a second conversion circuit coupled to the second port; and
a driver;
wherein the first conversion circuit comprises a first flying capacitor coupled to a first network of switches, and a first inductor and a second inductor both coupled to the second conversion circuit;
wherein the second conversion circuit comprises a reservoir capacitor and a second flying capacitor coupled to a second network of switches;
the driver being adapted to drive the first and the second network of switches with a sequence of states during a drive period, the sequence of states comprising at least one of a first phase, and a second phase,
wherein when the power converter operates as a step-down converter, the first phase is configured to charge the second flying capacitor and the second phase is configured to discharge the second flying capacitor by coupling the second flying capacitor in parallel to the reservoir capacitor, and when the power converter operates as a step-up converter, the first phase is configured to discharge the second flying capacitor by coupling the second flying capacitor in parallel to the reservoir capacitor and the second phase is configured to charge the second flying capacitor.

2. The power converter as claimed in claim 1, wherein the first network of switches comprises a first switch to couple the first flying capacitor to the first port;
a first ground switch to couple the first flying capacitor to ground;
a first inductor switch to couple the first flying capacitor to the second inductor; and
a second ground switch to couple the second inductor to ground.

3. The power converter as claimed in claim 2, wherein the second network of switches comprises a second switch to couple the first inductor and the second inductor to the second port;
a third switch to couple the second flying capacitor to the second port; and
a third ground switch to couple the second flying capacitor to ground.

4. The power converter as claimed in claim 3, wherein the first phase comprises at least one of a first state, a second state and a third state, wherein when the power converter operates as a step-down converter the first state is a de-magnetization state to demagnetize the first and the second inductors, the second state is a primary magnetization state to magnetize the first inductor and de-magnetize the second inductor, and the third state is a secondary magnetization state to magnetize the second inductor and de-magnetize the first inductor; and when the power converter operates as a step-up converter the first state is a magnetization state to magnetize the first and the second inductors, the second state is a primary de-magnetization state to de-magnetize the first inductor and magnetize the second inductor, and the third state is a secondary de-magnetization state to de-magnetize the second inductor and magnetize the first inductor.

5. The power converter as claimed in claim 4, wherein the second phase comprises at least one of a fourth state, a fifth state, and a sixth state; wherein when the power converter operates as a step-down converter the fourth state is a de-magnetization state to demagnetize the first and the second inductors, the fifth state is a primary magnetization state to magnetize the first inductor and de-magnetize the second inductor, and the sixth state is a secondary magnetization state to magnetize the second inductor and de-magnetize the first inductor; and when the power converter operates as a step-up converter the fourth state is a magnetization state to magnetize the first and the second inductors, the fifth state is a primary de-magnetization state to de-magnetize the first inductor and magnetize the second inductor, and the sixth state is a secondary de-magnetization state to de-magnetize the second inductor and magnetize the first inductor.

6. The power converter as claimed in claim 5, wherein in the fourth state the first port is de-coupled from the second port and the ground port is coupled to the second port via a first path, a second path, and a third path; the first path comprising the first ground switch, the first inductor, and the second switch, wherein the second path comprises the second ground switch, the second inductor, and the second switch; wherein the third path comprises the third ground switch, the second flying capacitor and the second switch.

7. The power converter as claimed in claim 5, wherein in the fifth state, the first port is coupled to the second port via a path comprising the first switch, the first flying capacitor, the first inductor and the second switch; and wherein the ground port is coupled to the second port via a first ground path, and a second ground path wherein the first ground path comprises the third ground switch, the second inductor, and the second switch; and wherein the second ground path comprises the third ground switch, the second flying capacitor, and the second switch.

8. The power converter as claimed in claim 5, wherein in the sixth state, the first port is de-coupled from the second port and the ground port is coupled to the second port via a first ground path, a second ground path, and a third ground path; the first ground path comprising the first ground switch, the first flying capacitor, the first inductor switch, the second inductor and the second switch; wherein the second ground path comprises the first ground switch, the first inductor, and the second switch; and wherein the third ground path comprises the third ground switch, the second flying capacitor and the second switch.

9. The power converter as claimed in claim 5, wherein the first conversion circuit comprises a third flying capacitor; and wherein the first network of switches comprises a fourth switch to couple the third flying capacitor to the first port, and a second inductor switch to couple the third flying capacitor to the first inductor.

10. The power converter as claimed in claim 9, wherein in the second state, the first port is coupled to the second port via a path comprising the first switch, the first flying capacitor, the first inductor, the second flying capacitor and the third switch; and wherein the ground port is coupled to the second port via a first ground path and a second ground path, the first ground path comprising the third ground switch, the third flying capacitor, the second inductor switch, the first inductor, the second flying capacitor and the third switch; and wherein the second ground path comprises the third ground switch, the second inductor, the second flying capacitor and the third switch.

11. The power converter as claimed in claim 9, wherein in the third state, the first port is coupled to the second port via a path comprising the fourth switch, the third flying capacitor, the second inductor, the second flying capacitor and the third switch; and wherein the ground port is coupled to the second port via a first ground path and a second ground path, the first ground path comprising the first ground switch, the first flying capacitor, the first inductor switch, the second inductor, the second flying capacitor and the third switch; and wherein the second ground path comprises the first ground switch, the first inductor, the second flying capacitor and the third switch.

12. The power converter as claimed in claim 9, wherein in the fifth state, the first port is coupled to the second port via a path comprising the first switch, the first flying capacitor, the first inductor and the second switch; and wherein the ground port is coupled to the second port via a first ground path, a second ground path and a third ground path; the first ground path comprising the third ground switch, the third flying capacitor, the second inductor switch, the first inductor and the second switch; wherein the second ground path comprises the third ground switch, the second inductor, and the second switch; and wherein the third ground path comprises the third ground switch, the second flying capacitor, and the second switch.

13. The power converter as claimed in claim 9, wherein in the sixth state, the first port is coupled to the second port via a path comprising the fourth switch, the third flying capacitor, the second inductor, and the second switch; and wherein the ground port is coupled to the second port via a first ground path, a second ground path, and a third ground path; the first ground path comprising the first ground switch, the first flying capacitor, the first inductor switch, the second inductor and the second switch; wherein the second ground path comprises the first ground switch, the first inductor, and the second switch; and wherein the third ground path comprises the third ground switch, the second flying capacitor and the second switch.

14. The power converter as claimed in claim 9, wherein the second conversion circuit further comprises a fourth flying capacitor, and wherein the second network of switches further comprises a fifth switch to couple the fourth flying capacitor to the second port; and a fourth ground switch to couple the fourth flying capacitor to ground.

15. The power converter as claimed in claim 5, wherein the driver is adapted to maintain the second state and the third state for a same predetermined duration, and/or wherein the driver is adapted to maintain the fifth state and the sixth state for a same predetermined duration.

16. The power converter as claimed in claim 4, wherein in the first state the first port is de-coupled from the second port and the ground port is coupled to the second port via a first path and a second path, the first path comprising the first ground switch, the first inductor, the second flying capacitor and the third switch; and the second path comprising the second ground switch, the second inductor, the second flying capacitor and the third switch.

17. The power converter as claimed in claim 4, wherein in the second state, the input port is coupled to the second port via a path comprising the first switch, the first flying capacitor, the first inductor, the second flying capacitor and the third switch; and wherein the ground port is coupled to the second port via a ground path comprises the third ground switch, the second inductor, the second flying capacitor and the third switch.

18. The power converter as claimed in claim 4, wherein in the third state, the first port is de-coupled from the second port, and the ground port is coupled to the second port via a first ground path and a second ground path, the first ground path comprising the first ground switch, the first flying capacitor, the first inductor switch, the second inductor, the second flying capacitor and the third switch; and wherein the second ground path comprises the first ground switch, the first inductor, the second flying capacitor and the third switch.

19. The power converter as claimed in claim 1, wherein the driver is adapted to operate the first network of switches at a first frequency, and the second network of switches at a second frequency.

20. A method of converting power with an output-to-input conversion ratio, the method comprising providing a power converter having a ground port, a first port, and a second port, wherein when the power converter operates as a step-down converter the first port receives an input voltage and the second port provides the output voltage and when the power converter operates as a step-up converter the second port receives an input voltage and the first port provides the output voltage; the power converter comprising a first conversion circuit coupled to the first port, a second conversion circuit coupled to the second port;

wherein the first conversion circuit comprises a first flying capacitor coupled to a first network of switches, and a first inductor and a second inductor both coupled to the second conversion circuit;

wherein the second conversion circuit comprises a reservoir capacitor and a second flying capacitor coupled to a second network of switches;

driving the first and the second network of switches with a sequence of states during a drive period, the sequence of states comprising at least one of a first phase and a second phase, wherein when the power converter operates as a step-down converter, the second flying capacitor charges in the first phase and discharges in the second phase, and when the power converter operates as a step-up converter, the second flying capacitor discharges in the first phase and charges in the second phase; wherein the second flying capacitor is coupled to the reservoir capacitor when discharging.

\* \* \* \* \*